United States Patent [19]

Kuwana et al.

[11] 4,453,725
[45] Jun. 12, 1984

[54] ROAD VEHICLE LEVEL CONTROLLER

[75] Inventors: Kazutaka Kuwana; Masahiro Ueda, both of Toyota; Seiji Nonoyama, Kariya, all of Japan

[73] Assignees: Seiki Kabushikikaisha; Toyota Jidosha Kogyo Kabushikikaisha, both of Toyota, Japan

[21] Appl. No.: 337,201

[22] Filed: Jan. 5, 1982

[30] Foreign Application Priority Data

Jan. 30, 1981 [JP] Japan .................................. 56-12772

[51] Int. Cl.³ ........................................... B60G 17/00
[52] U.S. Cl. .................................... 280/6 R; 280/707
[58] Field of Search ............................. 280/6 R, 707; 267/64.16

[56] References Cited

U.S. PATENT DOCUMENTS 4,293,139 10/1981 Brown .................................. 280/707
4,364,574 12/1982 Saito .................................... 280/707
4,377,293 3/1983 Senoo .................................. 280/707

*Primary Examiner*—Richard A. Bertsch
*Attorney, Agent, or Firm*—Sughrue, Mion, Zinn, Macpeak and Seas

[57] ABSTRACT

A vehicle level controller produces a level lowering command signal whenever the sprung mass of a road vehicle is higher than a given trim band and produces a level raising command signal when the sprung mass is below the trim band. The command signal is applied to a levelling system. The trim band is divided into a high (medium high), center (medium center) and low (medium low) regions. A vehicle level detector produces a signal which distinguishes a vehicle level in five different zones including a range higher than the trim band, a medium high region within the trim band, a medium center region within the trim band, a medium low region within the trim band and a range lower than the trim band. The level lowering and the level raising command signal are withdrawn whenever a signal from the level detector indicates the medium center region within the trim band.

18 Claims, 10 Drawing Figures

ROAD VEHICLE LEVEL CONTROLLER

BACKGROUND OF THE INVENTION

The invention relates to a level control of a road vehicle, in particular, to the adjustment of a vehicle level within a given range by detecting the relative height between the axle and the frame of a carrosserie by means of a level detector and controlling a hydraulic pressure supplied to a suspension system in accordance with the detected height.

An example of the level adjustment of the kind described is disclosed in U.S. Pat. No. 4,105,216 (issued Aug. 8, 1978, Class 280), for example, in which a level detector detects a range of vehicle level, and the detected signal is processed in a signal processing circuit to derive a signal which energizes a levelling drive system. The signal is applied to a level control circuit which causes a hydraulic pressure supplied to a suspension system to be reduced if the vehicle level is determined to be "high" and causes the hydraulic pressure to be increased if the vehicle level is determined to be "low". In order to prevent a repetitive operation to reduce or increase the hydraulic pressure which would occur as the detected vehicle level oscillates adjacent to the boundary between "medium" and "high" or between "medium" and "low" range, the level control circuit includes a set of leading end delay circuits in each of "high" and "low" level signal processing loops.

The levelling drive system is energized to lower or raise the vehicle height at a given time interval after the detection of the vehicle height in either high or low range, respectively. If the vehicle level is determined to be in the medium range, the levelling drive system is immediately deenergized. Therefore, there is a tendency for the vehicle level to be settled in the medium range adjacent to the boundary with the high or the low range, resulting in a large deviation which is obtained in the settled level of the vehicle. In addition, the frequency of the energization or deenergization of the levelling drive system increases.

SUMMARY OF THE INVENTION

It is a first object of the invention to lessen the repetition of the energization or deenergization of the vehicle level adjustment, and a second object is to reduce a deviation between the levels where the vehicle height is settled.

The above objects are accomplished in accordance with the invention by energizing a suspension drive system to lower or raise the vehicle height in a high and a low level range, respectively, and deenergizing the drive system in a "medium center" level region which is defined by an upper boundary which is lower than the lower limit of the high level range and a lower boundary which is higher than the upper limit of the low level range.

Other objects and features of the invention will become apparent from the following description of preferred embodiments with reference to the drawings.

BRIEF DESCRIPTION OF THE DRAWINGS

FIG. 1b is a longitudinal section of the level detector shown in FIG. 1a;

FIG. 3b is a flow chart illustrating a sequence of control operations performed by a microcomputer shown in FIG. 3a.

DESCRIPTION OF EMBODIMENTS

Figure 1A:
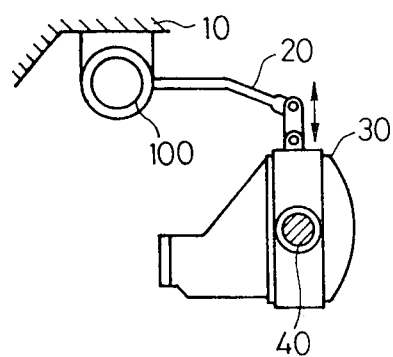
FIG. 1a is a schematic view of a level detector used in carrying out the invention which is mounted on a vehicle.
Figure 1B:
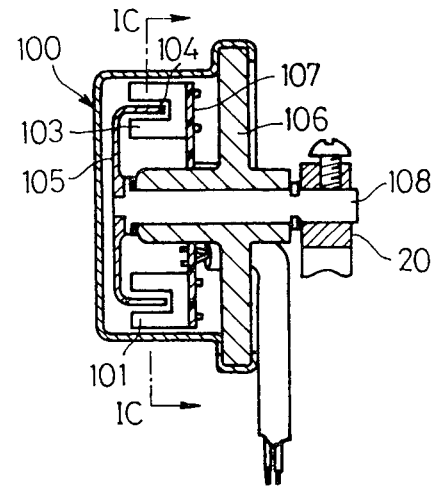
Figure 1C:
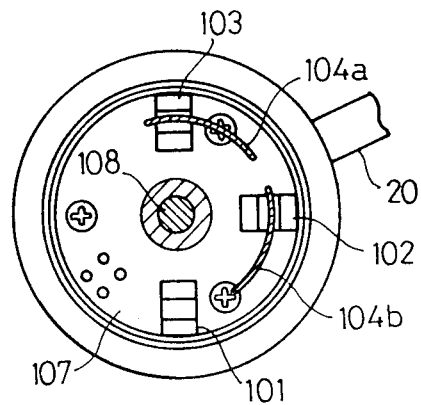
FIGS. 1c, 1d, 1e, 1f and 1g are cross sections taken along the line IC—IC shown in FIG. 1b, illustrating different operating conditions.
Figure 1D:
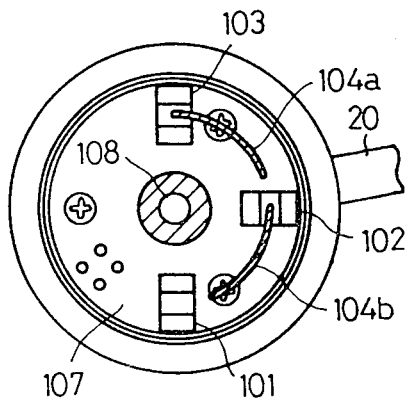
Figure 1E:
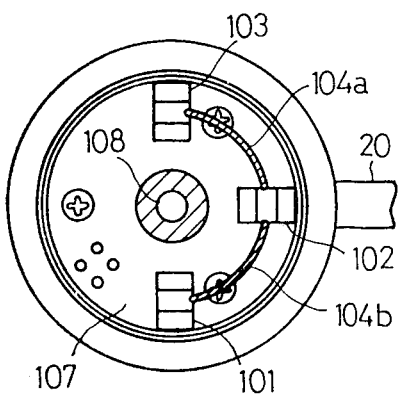
Figure 1F:
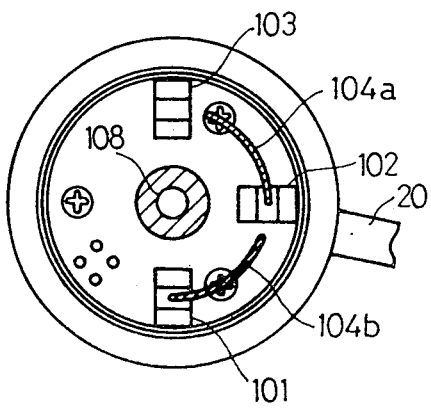
Figure 1G:
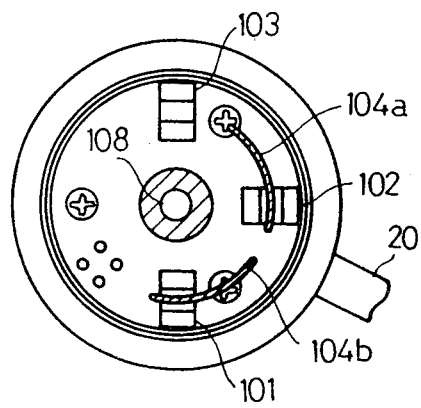
Figure 2:
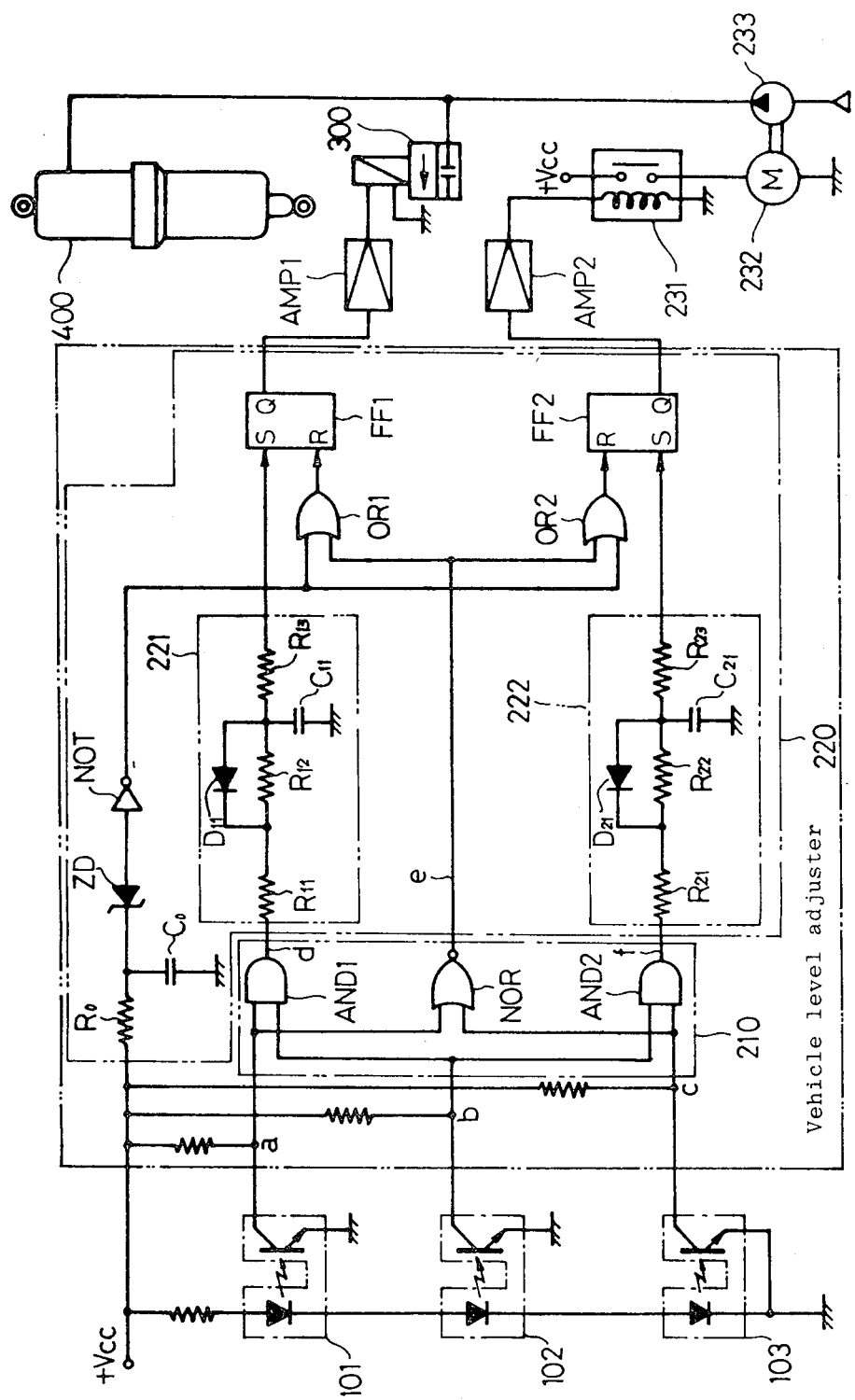
FIG. 2 is a block diagram of one form of a vehicle level adjuster of the invention.

FIGS. 1a to 1g show a vehicle level detector used in the illustrated embodiments of the invention. Specifically, a vehicle level detector 100 is fixedly mounted on the frame 10 of a carroserie as shown in FIG. 1a, and includes a rotary shaft to which one end of a link 20 is coupled. The other end of the link 20 is coupled to an outer casing of a differential gear 30. An axle is shown at 40. The level detector 100 is shown in longitudinal section in FIG. 1b. The level detector 100 includes a rotary shaft 108, on the free end of which is fixedly mounted a light shield 105 formed with a pair of turnbacks 104a, 104b which are in the form of arcuate segments. The link 20 is fixedly connected to the other end of the shaft 108. The detector includes a base 106 on which is fixedly mounted a printed wiring board 107, which in turn fixedly carries a plurality of photo-sensors 101, 102, 103. FIGS. 1c to 1g show cross sections taken along the line IC—IC shown in FIG. 1b. FIG. 1c corresponds to a "low" vehicle level, FIG. 1d to a "medium low" level, FIG. 1e to a "medium center" level, FIG. 1f to a "medium high" level and FIG. 1g to a "high" level, respectively. Each of the photo-sensors 101, 102 and 103 comprises a combination of a light emitting diode and a phototransistor as shown in FIG. 2, whereby light emitted by the light emitting diode is received by the corresponding photo-transistor. However, the turnbacks 104a, 104b of the light shield 105 intercept such light depending on the vehicle level. Relationship between the potentials developed at the output terminals a, b and c of the photo-sensors 101, 102 and 103 and outputs d, e and f from a signal processor 210 (see FIG. 2) is shown in the Table 1 below.

TABLE 1

| vehicle level | sensor output | | | processor output | | |
| --- | --- | --- | --- | --- | --- | --- |
| | a | b | c | d | e | f |
| high (FIG. 1g) | H | H | L | H | L | L |
| high (FIG. 1f) | H | L | L | L | L | L |
| medium center (FIG. 1e) | L | L | L | L | H | L |
| low (FIG. 1d) | L | L | H | L | L | L |
| low (FIG. 1c) | L | H | H | L | L | H |

FIG. 2 shows the overall arrangement of one embodiment of the invention. The arrangement includes a signal processor 210, a level control circuit 220, a suspension system 400, a relay 231 for energizing a motor 132 which is associated with an air compressor 233, and a relief valve 300.

The signal processor 210 comprises AND gate AND1 and AND2 and NOR gate NOR. The level control circuit 220 comprises a combination of resistor $R_0$, capacitor $C_0$, Zener diode ZD and inverter NOT, which combination is used for purpose of resetting upon power on, a pair of delay circuits 221, 222, a pair of flipflops FF1 and FF2 which are used for levelling energization purpose and a pair of OR gates OR1 and OR2 which are used to reset these flipflops.

When the power supply +Vcc is supplied, the output of the inverter NOT initially rises to its high level H, which resets the flipflops FF1, FF2. At a given time interval thereafter, which is determined by the time constant of the components $R_0$, $C_0$, the voltage across the capacitor $C_0$ reaches the breakdown voltage of the Zener diode ZD, which therefore conducts to change the outputs of the inverter NOT to its low level L. In this manner, the initialization in response to the poewr on is achieved.

When a "low" vehicle level prevails, and the level detector 100 assumes the condition shown in FIG. 1C, the outputs a to c from the photo-sensors 101 to 103 are "L", "H" and "H", respectively. The output f from AND gate AND2 assumes an "H" level while the output d from AND1 and the output e from NOR gate NOR assume an "L" level. The output f from AND2 is effective to charge a capacitor $C_{21}$ at a rate which is determined by the time constant of resistors $R_{21}$, $R_{22}$ and capacitor $C_{21}$ in the delay circuit 222. When the voltage across the capacitor $C_{21}$ reaches a level which is sufficient to set the flipflop FF2, the latter is set, whereby its Q output is fed through an amplifier AMP2 and the associated relay 231 to drive the motor M. In this manner, an increased hydraulic pressure is applied to the suspension system 400 from the compressor 233. As the pressure supplied to the suspension system 400 increases to a value which causes the level detector to assume a condition illustrated in FIG. 1d, the outputs a to c from the photo-sensors 101 to 103 assume "L", "L" and "H" levels, respectively, causing the output f from AND2 to revert to "L" level. However, the compressor 233 remains operative. As a result of the output f from AND gate AND2 reverting to "L" level or the ground level, the capacitor $C_{21}$ in the delay circuit 222 discharges through a diode $D_{21}$ and resistor $R_{21}$ until the ground level L is reached. When the vehicle level enters the "medium center" region shown in FIG. 1e, both outputs a and b assume "L" levels, whereby the output from the NOR gate NOR changes from its "L" to "H" level. The resulting output is fed through OR gate OR2 to reset the flipflop FF2, whereupon the compressor 233 ceases to operate. As mentioned previously, the capacitor $C_{21}$ discharges when the output from AND gate AND2 changes to the ground level. Thus the compressor 223 is driven only after the flipflop FF2 is set when the low vehicle level continues over a period $t_2$ which corresponds to the time interval required to charge the delay circuit 222. If the vehicle level changes from its low range to its medium (medium low) range during the interval $t_2$, the delay circuit is reset, and conseauently, the compressor fails to be driven. As a result, only when the high vehicle level is reached and continues over the interval $t_2$, the compressor 233 is driven, and ceases to operate after the vehicle level reaches the medium center region (see FIG. 1e). As compared with the conventional arrangement in which the compressor is controlled to be driven or stopped at the boundary between the lower limit of the medium range (medium low) and the upper limit of the low range, in accordance with the invention, the compressor begins to be driven below the boundary and is stopped after the vehicle level has changed from the medium low to the medium center region, thus providing a hysteresis response.

When the vehicle level is high, a similar operation occurs on the understanding that AND gate AND2 is replaced by AND1, the output f by the output d, the delay circuit 222 by the delay circuit 221 and the flipflow FF2 by the flipflop FF1, and the drive of the compressor 233 by the opening of the relief valve 300 while the stop thereof by the closure of the valve. In the described embodiment, it is to be understood that the combination of the signal processor 210 and the level control circuit 220 forms a vehicle level or height adjuster of the invention.

Figure 3A:
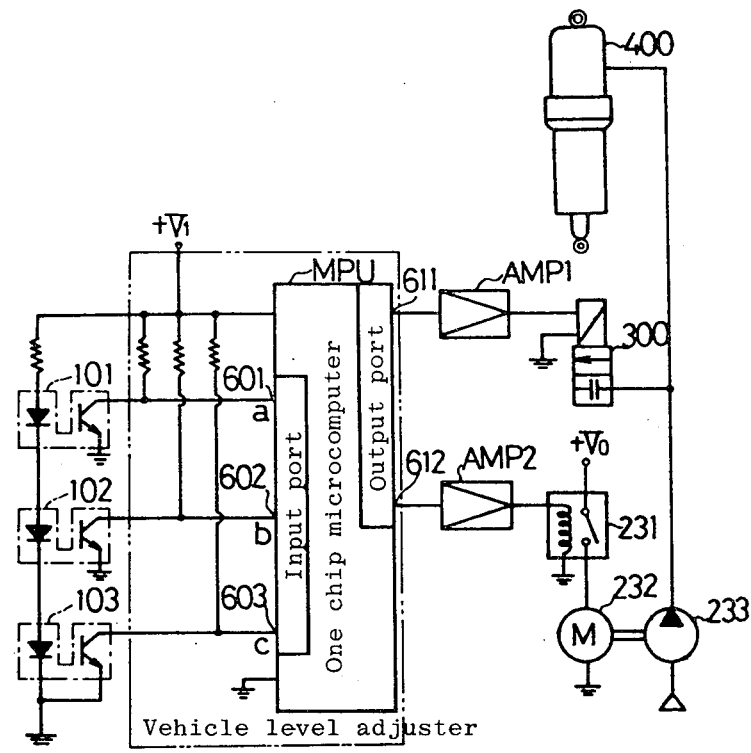
FIG. 3a is a block diagram of another form of vehicle level adjuster.
Figure 3B:
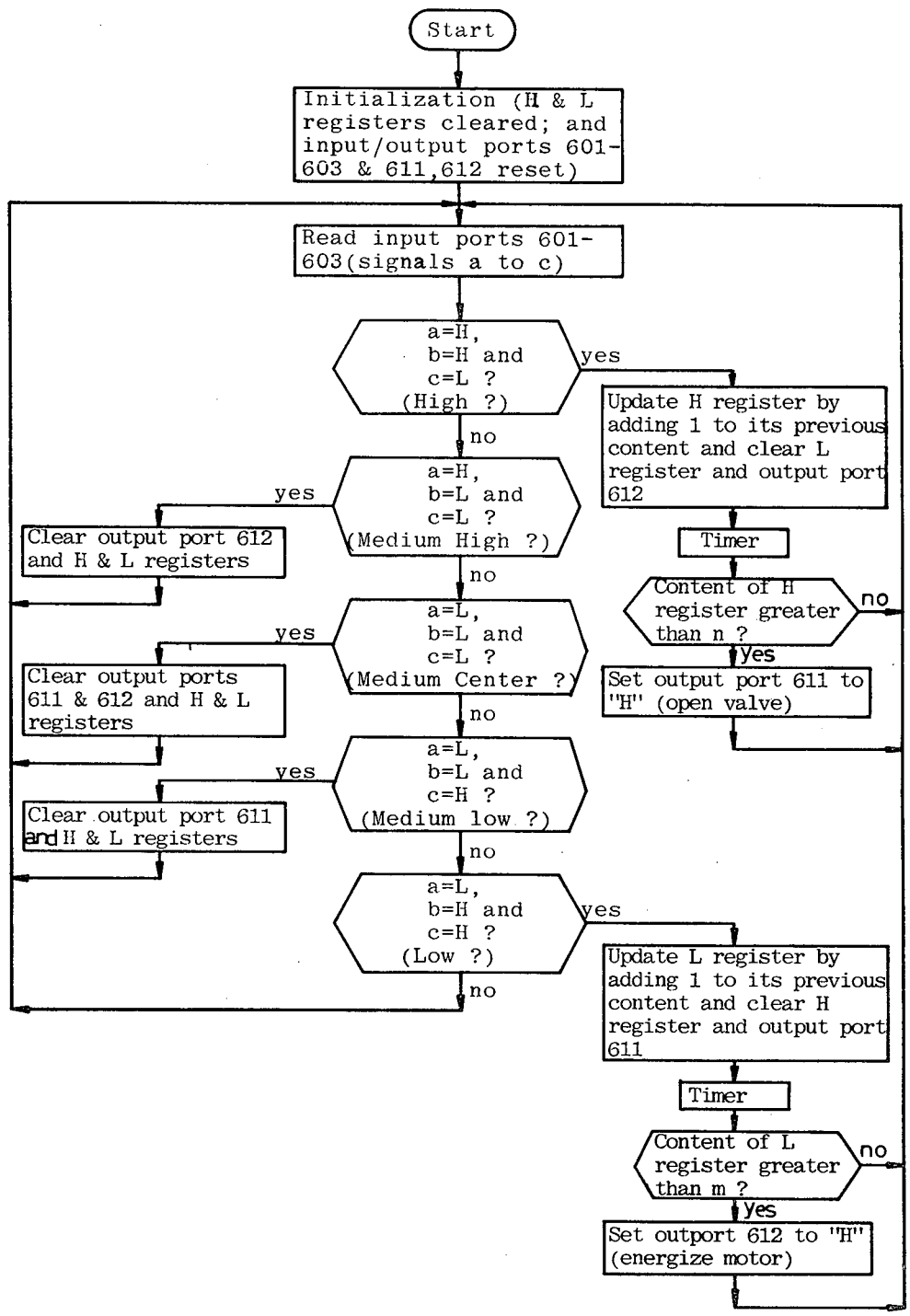

FIG. 3a shows another embodiment of the invention in which a vehicle level adjuster comprises a single chip microcomputer MPU. In this embodiment, the microcomputer MPU includes a read-only memory ROM storing program data which is adapted to set an "H" level (opening the relief valve 300) at an output port 611 for a high range of vehicle level (a, b=H, c=L), set an "H" level (energizing the motor 232) at an output port 612 for a low range of vehicle level (a=L, b, c=H), and set an "L" level (clear) at output ports 611 and 612 for a medium center region of the vehicle level (a, b, c=L). A flow chart representing the control operation by the microcomputer MPU in accordance with such program data is shown in FIG. 3b. In this flow chart, a register refers to a memory location within a random access memory RAM of the microcomputer MPU, and a timer refers to the execution of a program timer which counts a given number of clock pulses (or timing pulses).

A control operation by the microcomputer MPU will now be described with reference to FIG. 3b. The microcomputer reads input ports 601 to 603 (or signals a to c, refer Table 1), and when they indicate a "high" range of vehicle level, it updates an "H" register by adding 1 to the previous content thereof. For the sake of assurance, it clears the output port 612 and executes a program timer. Upon time-out, it checks the content of the "H" register, and if the content is equal to or greater than a given value n, it sets the output port 611 to an "H" level, thus opening the relief valve 300. The "H" level of the output port 611 is cleared (or the relief valve is closed) when the vehicle level reaches the "medium center" region, and for purpose of assurance, when the vehicle level goes to the "medium low" region. If the content of the H register is less than the value n, the microcomputer returns to reading the input ports. If the vehicle level changes from the "medium high" region to the "high" range, the relief valve 300 is not opened immediately, but the valve 300 is opened only after the "high" level continues over a time interval nt (where t represents a time limit defined by the timer) in order to allow the adjustment of the vehicle level to be stabilized by preventing the relief valve 300 from being opened if the oscillations occurring in a vehicle temporarily produces a "high" level. If the vehicle level changes to the "medium high" region within a time interval less than the interval nt since it has assumed the "high" range, the time accumulated for the "high" level is cleared from the H register.

When the signals a to c from the input ports 601 to 603 indicate a vehicle level in the "low" range, the microcomputer updates an L register by adding 1 to the previous content thereof. For the sake of assurance, the output port 611 is cleared, and the program timer is executed. Upon time-out, the content of the L register is checked, and if the content is equal to or greater than a given value m, the microcomputer sets the output port 612 to an "H" level, thus driving the compressor 233.

The "H" level at the output port 612 is cleared (the compressor is stopped) when the vehicle level changes to the "medium center" region, and for purpose of assurance, when the vehicle level enters the "medium high" region. If the content of the L register is less than the given value m, the microcomputer returns to reading the input ports. Consequently, if the vehicle level changes from the "middle low" region to the "low" range, the compressor 233 is not driven immediately, but is driven only after the vehicle level remains in the "low" range continuously over the time interval mt in order to allow the adjustment of the vehicle level to be stabilized by preventing the compressor 233 from being driven if the oscillations of the vehicle temporarily produce a "low" range vehicle level. The time accumulated for the "Low" level is cleared from the L register if the vehicle level enters the "medium low" region within a time interval less than mt since it has assumed the "low" range level.

As discussed, in accordance with the invention, a region of vehicle level where the levelling adjustment is stopped is located closer to the center of the medium range than a region of vehicle level where the levelling adjustment is initiated, with a gap therebetween. This reduces the number of repeated levelling adjustments, and prevents a large deviation between the vehicle levels achieved by the levelling adjustment, which would occur if such levels were offset toward the high or the low range.

What is claimed is:

1. A vehicle level controller comprising
   a vehicle level detector including three switch means secured to a printed circuit board and switch operating means fixedly mounted on a rotary shaft;
   signal processing means for processing signals fed from the three switch means of the level detector to form three signals indicative of a vehicle level in a high range, in a medium high region and in a low range, respectively;
   first delay means responsive to the occurrence of a signal indicative of a vehicle level in the high range to produce a level lowering signal only if such signal continues over a given duration;
   second delay means responsive to the occurrence of a signal indicative of a vehicle level in the low range to produce a level lowering signal only if such signal continues over a given duration;
   a first flipflop which is set by the level lowering signal and which is reset by a signal indicative of a vehicle level in the medium high region;
   and a second flipflop which is set by the level raising signal and which is reset by a signal indicative of a vehicle level in the medium high region.

2. A vehicle level controller according to claim 1, further comprising power-on responsive reset means for resetting the first and the second flipflop in response to the application of a power supply.

3. A vehicle level controller comprising
   a vehicle level detector including three switch means secured to a printed circuit board and switch operating means fixedly mounted on a rotary shaft;
   and a microcomputer which determines a vehicle level in either a high range, a medium high region, a medium center region, a medium low region and a low range responsive to signals fed from the three switch means of the level detector, counts a time duration during which a vehicle level in the high or the low range continues, clears a count representing the time duration during which a vehicle level in the high range continues whenever a vehicle level in the low range, the medium low region, the medium center region or the medium high region is detected, clears a count representing the time duration during which a vehicle level in the low range continues whenever a vehicle level in the high range, the medium high region, the medium center region or the medium low region is detected, outputs a level lowering command signal when a count representing the time duration during which a vehicle level in the high region continues exceeds a first value n, outputs a level raising command signal when a count representing the time duration during which a vehicle level in the low range continues exceeds a second value m, and resets the level lowering and the level raising command signal in response to a detected vehicle level in the medium center region.

4. A vehicle level controller according to claim 3 in which the microcomputer includes output ports from which the vehicle lowering and the vehicle raising command signal are delivered, the microcomputer resetting the output ports immediately upon the application of a power supply thereto.

5. A vehicle level controller comprising:
   vehicle level detecting means for generating signals indicating one of five possible levels; high range, medium high range, medium center range, medium low range, and low range; and
   a vehicle level adjuster responsive to the signals, setting and supplying a level-down signal to a level down driver of a vehicle leveling system when the signals indicate the high range, setting and supplying a level-up signal to a level up driver of the vehicle leveling system when the signals indicate the low range and reestting the level-down signal and the level-up signal when the signals indicate the medium center region.

6. A vehicle level controller according to claim 5 in which the vehicle level adjuster comprises:
   a signal processor for producing level-down signal when the signals from the vehicle level detecting means indicate the high range, level-up signal when the signals from the vehicle level detecting means indicate the low range and reset signal when the signals from the vehicle level detecting means indicate the medium center range; and a level control circuit for holding and supplying the level-down signal and the level-up signal to the vehicle leveling system until the reset signal appears.

7. A vehicle level controller according to claim 6 in which the level control circuit comprises:
   first delay means for delaying the level-down signal from the signal processor and supplying the level-down signal only if the former signal continues over a given duration; second delay means for delaying the level-up signal from the signal processor and supplying the level-up signal only if the former signal continues over a given duration; a first flipflop which is set by the level-down signal from the first delay means and supplies the level-down signal to the level down driver and which is reset by the reset signal; and a second flipflop which is set by the level-up signal from the second delay means and supplies the level-up signal to the level up driver and which is reset by the reset signal.

8. A vehicle level controller according to claim 7 in which the level control circuit further comprises power-on responsive reset means for resetting the first and the second flipflop in response to the application of a power supply to the vehicle level adjuster.

9. A vehicle level controller according to claim 5 in which the level detector comprises three switch means secured to a printed circuit board, and switch operating means fixedly mounted on a rotary shaft.

10. A vehicle level controller according to claim 9 in which each of the switch means comprises a photosensor including a light emitting source and a light detecting element, and the switch operating means comprises a light shield member which selectively intercepts a light path between the light emitting source and the light detecting element in accordance with the angle of rotation of the rotary shaft.

11. A vehicle level controller comprising:
vehicle level detecting means for generating signals indicating one of five possible levels; high range, medium high range, medium center range, medium low range and low range; and
a microcomputer counting a time duration during which a vehicle level continues in either the high or the low range, clears a count representing the time duration during which a vehicle level continues in the high range whenever a vehicle level in the medium center range is detected, clears a count representing the duration during which a vehicle level continues in the low range whenever a vehicle level in the medium center region is detected, outputs a level-down signal if the count representing the duration during which a vehicle level continues in the high range exceeds a first value n, outputs a level-up signal if the count representing the duration during which a vehicle level continues in the low range exceeds a second value m, and resets the level-down and level-up signal when a vehicle level is detected in a medium center range.

12. A vehicle level controller according to claim 11 in which the level detector comprises three switch means secured to a printed circuit board, and switch operating means fixedly mounted on a rotary shaft.

13. A vehicle level controller according to claim 12 in which each of the switch means comprises a photosensor including a light emitting source and a light detecting element, and the switch operating means comprises a light shield member which selectively intercepts a light path between the light emitting source and the light detecting element in accordance with the angle of rotation of the rotary shaft.

14. A vehicle level controller according to claim 11 in which the microcomputer includes output ports from which the vehicle level-down and vehicle level-up signal are delivered, the microcomputer resetting the output ports immediately upon the application of a power supply thereto.

15. A vehicle level controller comprising:
vehicle level detecting means for generating signals indicating one of five possible levels; high range, medium high range, medium center range, medium low range and low range; and
a microcomputer counting a time duration during which a vehicle level continues in either the high or the low range, clears a count representing the time duration during which a vehicle level in the high range continues whenever a vehicle level in the medium high range, the medium center range, the medium low range or low range is detected, clears a count representing the duration during which a vehicle level in the low range continues whenever a vehicle level in the high range, the medium high range, the medium center range or the medium low range is detected, outputs a level-down signal if the count representing the duration during which a vehicle level continues in the high range exceeds a first value n, outputs a level-up signal if the count representing the duration during which a vehicle level continues in the low range exceeds a second value m, and resets the level-down and level-up signal when a vehicle level in a medium center range is detected.

16. A vehicle level controller according to claim 15 in which the level detector comprises three switch means secured to a printed circuit board, and switch operating means fixedly mounted on a rotary shaft.

17. A vehicle level controller according to claim 16 in which each of the switch means comprises a photosensor including a light emitting source and a light detecting element, and the switch operating means comprises a light shield member which selectively intercepts a light path between the light emitting source and the light detecting element in accordance with the angle of rotation of the rotary shaft.

18. A vehicle level controller according to claim 15 in which the microcomputer includes output ports from which the vehicle level-down and vehicle level-up signal are delivered; the microcomputer resetting the output ports immediately upon the application of a power supply thereto.

* * * * *

UNITED STATES PATENT AND TRADEMARK OFFICE
CERTIFICATE OF CORRECTION

PATENT NO. : 4,453,725
DATED : June 12, 1984
INVENTOR(S) : Kazutaka Kuwana et al.

It is certified that error appears in the above-identified patent and that said Letters Patent is hereby corrected as shown below:

On the title page, Item [73] should read:

-- [73] Assignees: Aisin Seiki Kabushikikaisha, Aichi-Ken, Japan and

Toyota Jidosha Kogyo Kabushikikaisha, Aichi-Ken, Japan --.

Signed and Sealed this

Twelfth Day of March 1985

[SEAL]

Attest:

DONALD J. QUIGG

*Attesting Officer*     *Acting Commissioner of Patents and Trademarks*